June 1, 1954 M. DUNKLE 2,679,716
VEGETABLE GATHERING AND TOPPING DEVICE
Filed Feb. 6, 1951 5 Sheets-Sheet 1

INVENTOR.
MELVIN DUNKLE
BY
Fulwider and Mattingly
ATTORNEYS.

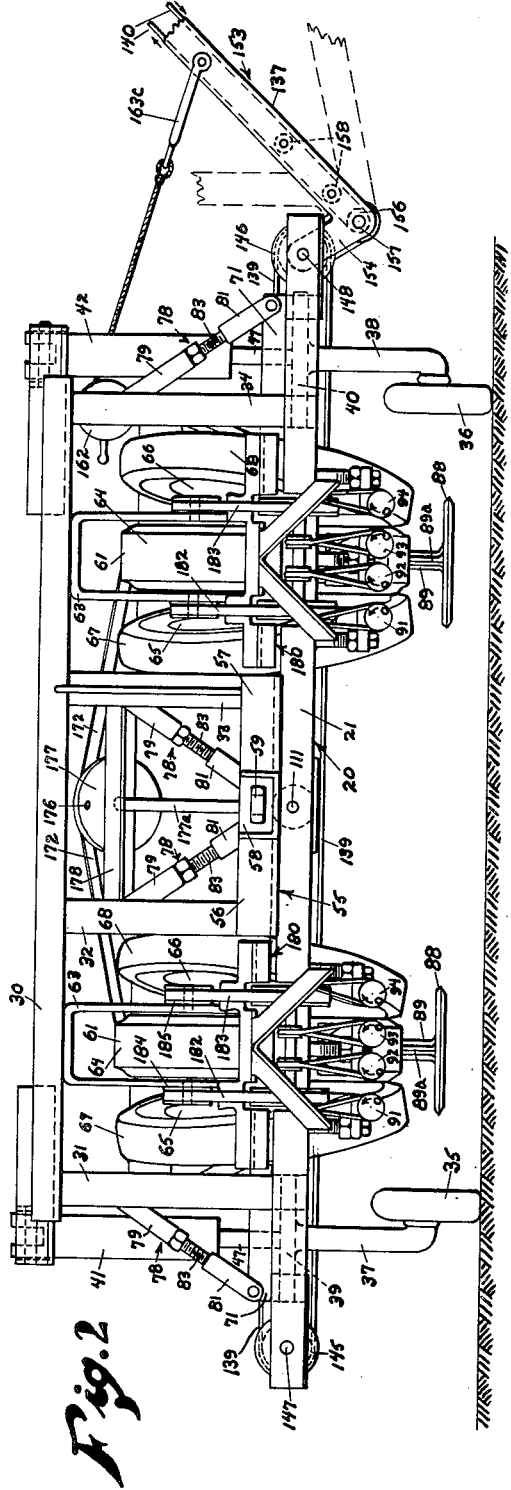
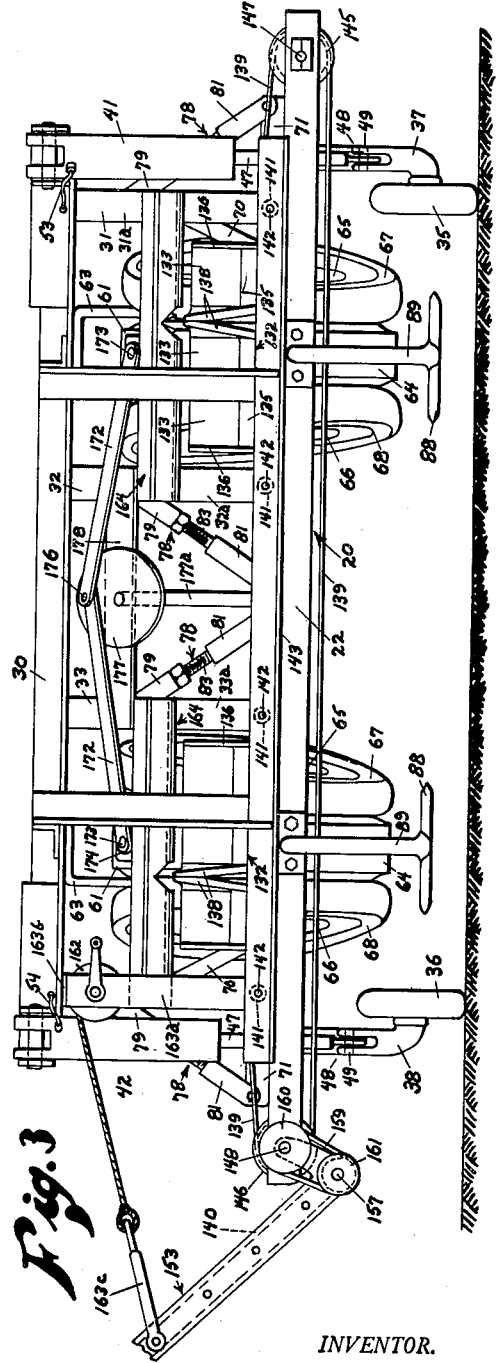

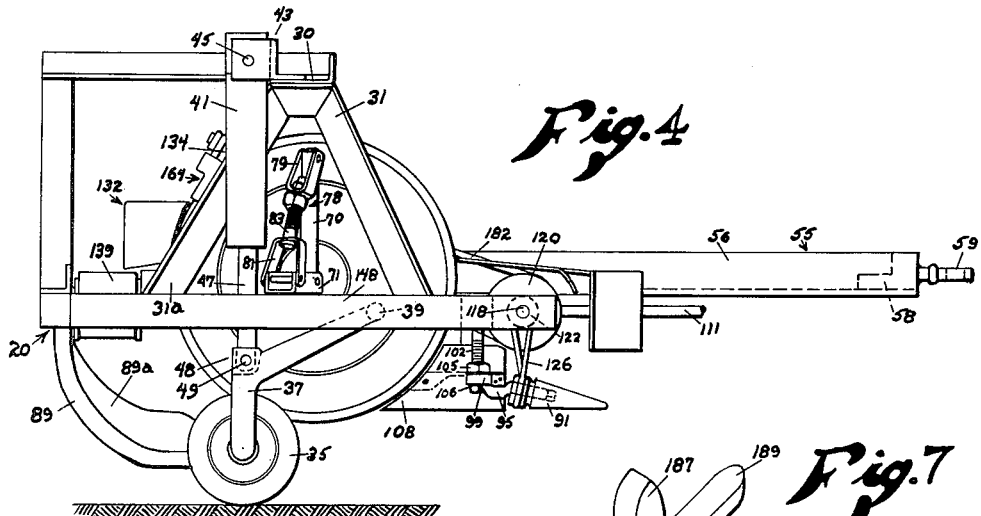
Fig. 4
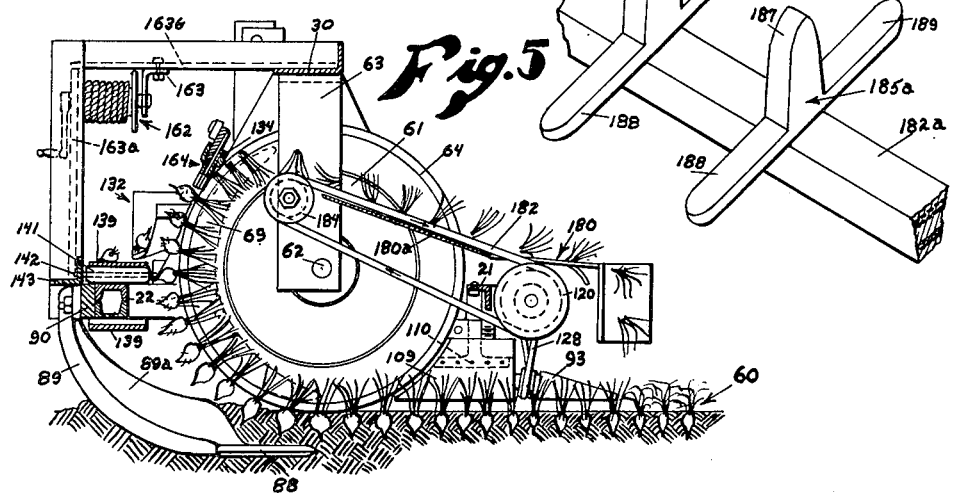
Fig. 5
Fig. 7
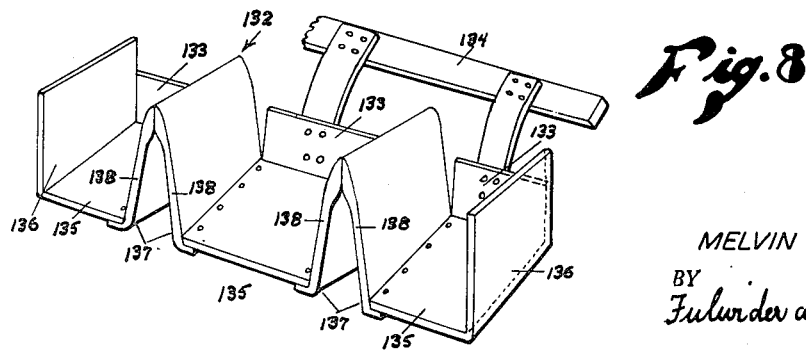
Fig. 8
INVENTOR.
MELVIN DUNKLE
BY Fulwider and Mattingly
ATTORNEYS.

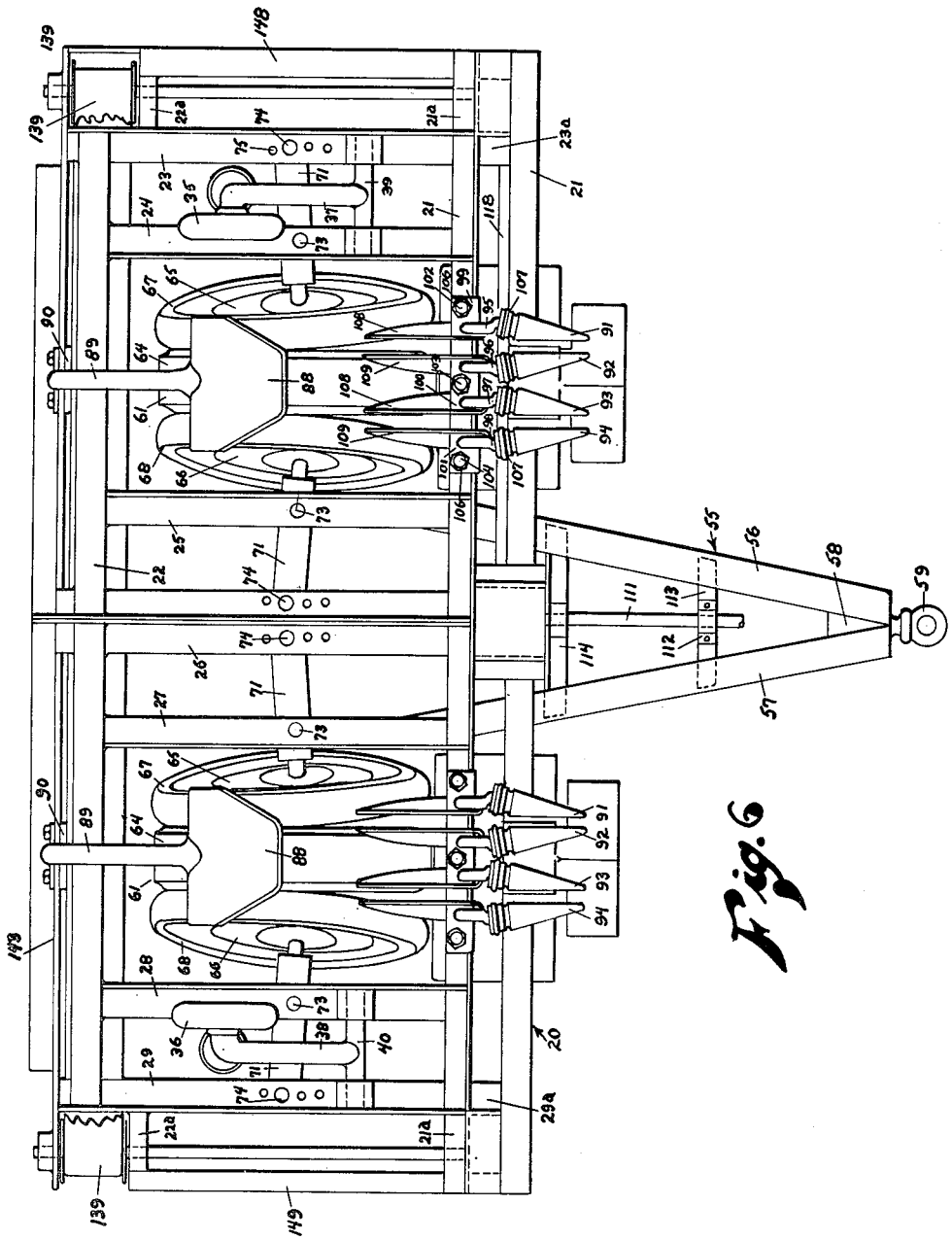

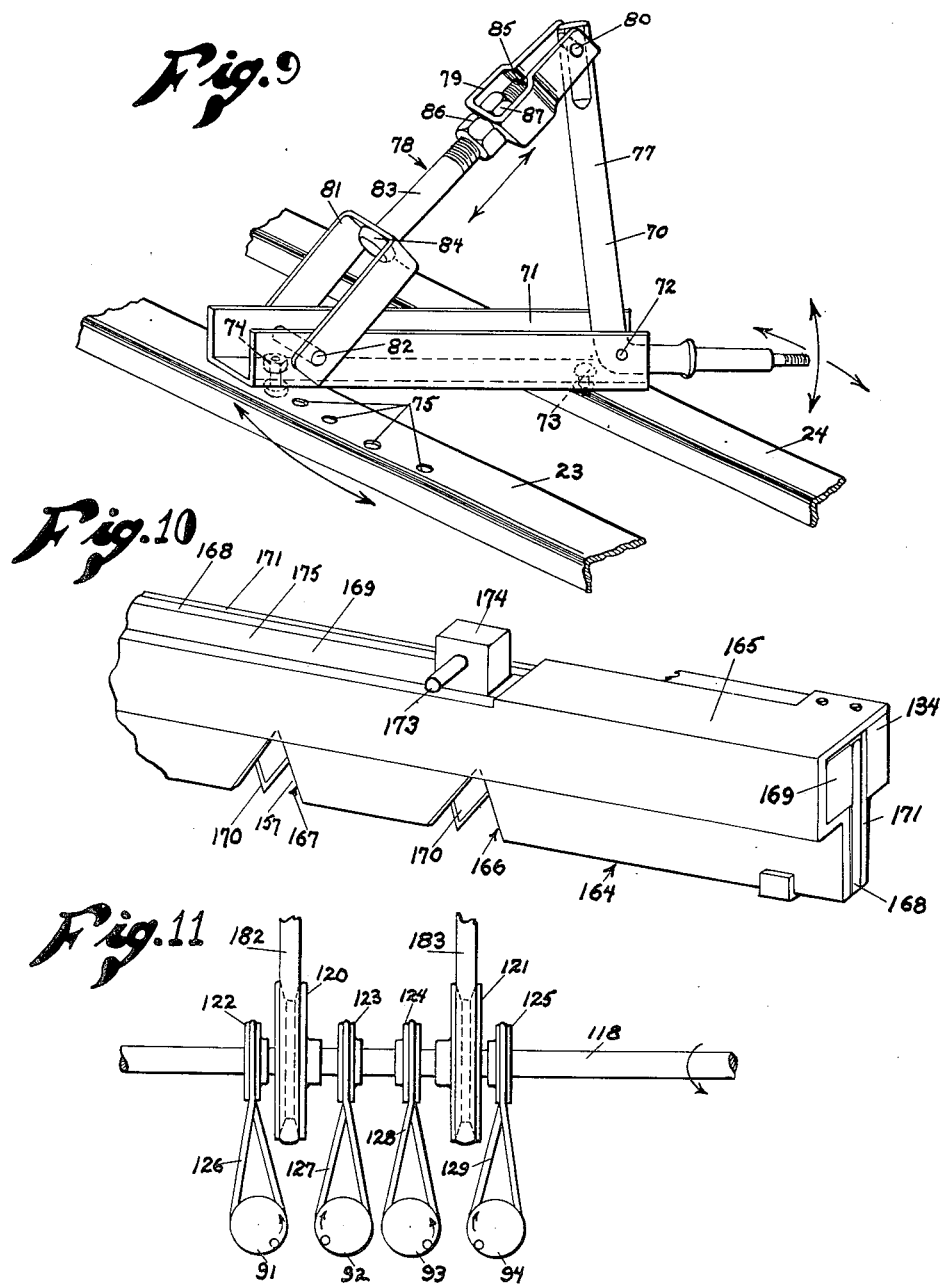

Patented June 1, 1954

2,679,716

UNITED STATES PATENT OFFICE 2,679,716

VEGETABLE GATHERING AND TOPPING DEVICE

Melvin Dunkle, Santa Maria, Calif.

Application February 6, 1951, Serial No. 209,579

6 Claims. (Cl. 55—108)

This invention relates to agricultural machines intended to effect the "pulling" or harvesting of root crops such as turnips or beets, and will be hereinafter described with particular reference to the pulling of beets. It is to be understood, however, that the machine of my invention may be utilized in the harvesting of various root crops of the kind in which the vegetable forms a bulbous body close to the surface of the ground, with a thick head of large leaves projecting upwardly from ground level.

Beets are usually planted in double rows spaced from the adjacent double rows, the leaves of the beets in one of the double rows being relatively close to the leaves of the beets in the adjacent row. The machine of my invention is designed to effect the pulling operation by means of resilient wheels which engage each other along a part of their peripheral portions to provide a vegetable head holding area effective to pull the vegetables from the soil as the wheels rotate consequent on the forward movement of the machine.

In addition to their harvesting function the wheels also serve to support the machine on the ground during operation.

The pulled beets may be collected with the leaves still adhering to the roots, but unless they are to be sold in vegetable markets, the leaves are cut from the beets before use and it is advantageous to arrange the harvesting machine so that the "topping" or cutting off of the leaves may be effected by the machine. The topped beets are delivered directly into trucks which may take their loads directly to processing plants or to collection dumps.

An operation incidental to the harvesting of root crops is the loosening of the soil around the roots, so that the roots may be readily lifted out of the ground by pulling upwardly on the leaves, without tearing the leaves from the roots. It is therefore an object of my invention to provide a root vegetable harvesting machine incorporating means for loosening the soil around the roots just prior to pulling them.

Agricultural equipment in general requires to be readily transportable over roads from one area to another and during such traveling the elements which work in the soil must, of course, be raised above ground level. One of the objects of my invention is to provide a simple mechanism effective to raise the operative elements of the machine above ground level during such traveling.

A further consideration to be met in harvesting crops such as beets is that they should be harvested during a relatively short period. Since such crops ordinarily cover large acreages a comparatively large force of workers is normally required for a short period, but by the use of my machine a large acreage of beets can be pulled in a minimum of time with a minimum work force.

The leaves of the beets provide a valuable fertilizing agent and also a nourishing feed material for cattle, and the leaves are therefore used for such purposes after having been cut from the roots. It is therefore another object of my invention to provide a root vegetable harvesting machine provided with means effective to top the beets as they are pulled and to eject the heads clear of the path of the pulling and supporting wheels of the machine and along defined lines. The described ejection of the leaves facilitates raking up of the heads if they are to be processed elsewhere, or of incorporating them into the top soil if they are to be used as fertilizer.

Another object of my invention is to provide a simple and strongly constructed root crop harvesting machine which may be operated with a minimum of personnel and which requires little maintenance to keep it in satisfactory operation.

A further object of my invention is to provide a machine adapted to be drawn by a tractor and having certain components operated by power taken from the tractor or from an independent source of power mounted on the machine, but having the root pulling elements operated by traction with the ground, thus reducing the amount of power required by the machine.

While beets are usually grown in double rows, they, as well as other root crops, may be grown in single rows or in strips four rows wide, accordingly it is another object of my invention to provide a harvesting machine which may be readily produced to harvest root crops growing in single rows or in groups of two rows and extending over any number of rows or groups of rows as may be considered most expedient.

When beets and other root crops are to be sold for use in their natural form it is, of course, desirable that they be free from blemishes such as are often caused by the tines of conventional beet harvesting machines, and it is a further object of my invention to provide a machine which can harvest beets by engagement with the heads of the beets instead of by the use of underground tines which may damage the beet bodies.

It is the general object of my invention to provide a machine for harvesting root crops of the character described which performs the operations above referred to in a simple, economical and generally more satisfactory manner than machines hitherto employed.

In the accompanying drawings,

Figure 2 is a front elevation of the machine as arranged when being moved from one place of operation to another, and taken along lines 2—2 of Figure 1;

Figure 3 is a rear elevation of the machine with its parts arranged as in Figure 2, and taken along line 3—3 of Figure 1;

Figure 4 is a side elevation looking from the left in Figure 2, and taken along lines 4—4 of Figure 1;

Figure 5 is a cross section on the line 5—5 in Figure 1, showing the parts in operative position;

Figure 6 is a plan view of the under side of the machine;

Figure 7 is a fragmentary perspective view of a modified belt construction used to remove cut off lead heads from the machine, drawn on a larger scale;

Figure 8 is a perspective view of parts operative to direct beets, after the heads have been cut off, to a collecting means for the beets, the view being drawn on a larger scale, and some of the parts being broken off to reduce their length;

Figure 9 is a perspective view of adjustable mounting means for disc or wheel-like means included in the beet pulling means of the machine, the view being drawn on a larger scale, and certain mounting means being broken through to reduce their length;

Figure 10 is a fragmentary perspective view of top cutting means included in the machine, the view being drawn on an enlarged scale; and Figure 11 is a fragmentary view, drawn on an enlarged scale, of the drawing means for top straightening means shown in Figure 2.

Figure 1:
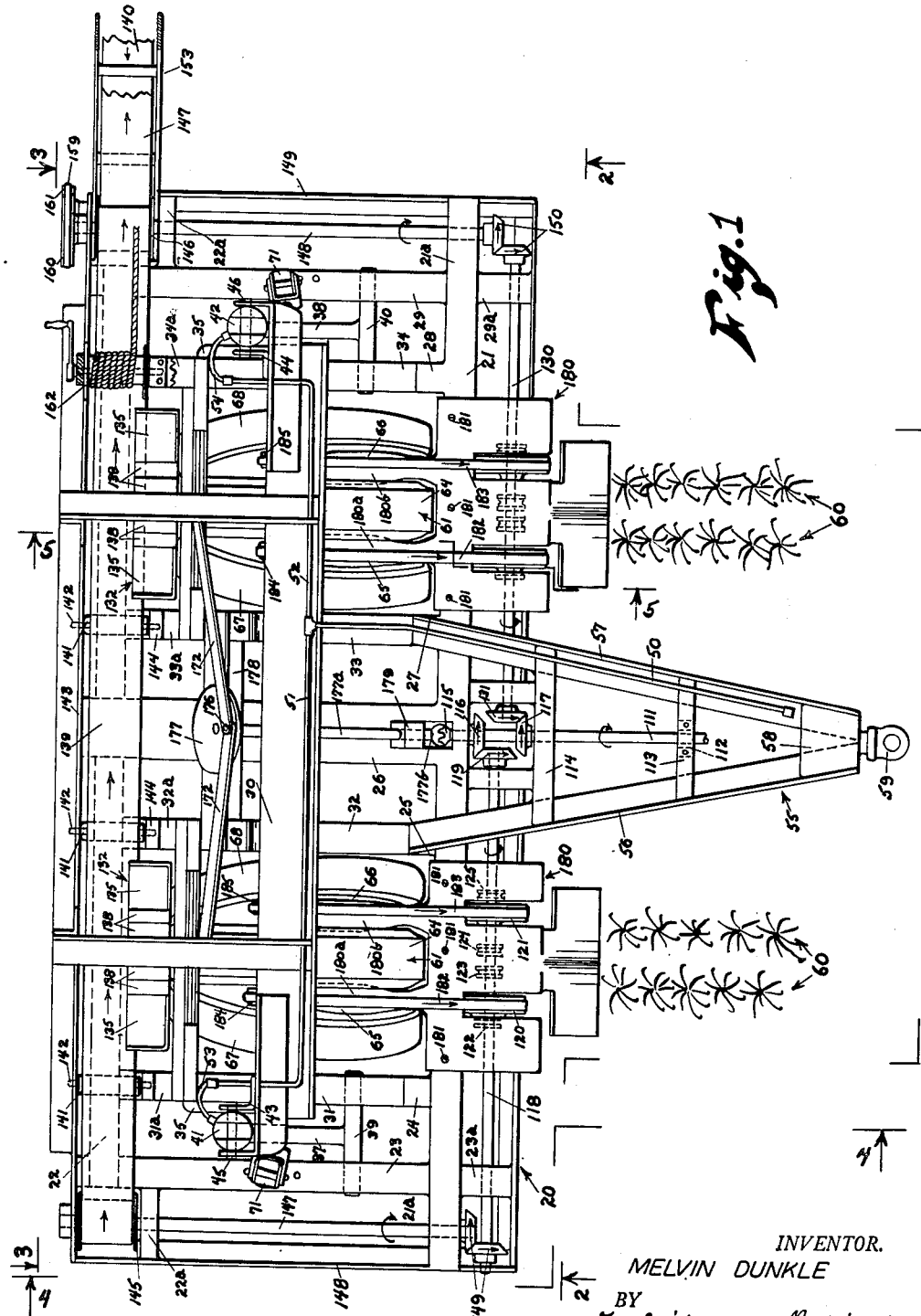
Figure 1 is a top plan view of the vegetable harvesting machine of my invention.

In the drawings the numeral 20 (Figure 1) indicates generally the frame of the machine which may be of any suitable arrangement, and as shown in the drawings, comprises front transverse member 21 and rear transverse member 22, connected by front to back members 23, 24, 25, 26, 27, 28 and 29.

A transverse frame member 30 is mounted in raised position by angularly arranged struts 31, 32, 33 and 34.

Retractible road wheels 35 and 36 (Figure 2) are mounted on crank arms 37 and 38 depending from shafts 39 and 40 mounted in bearings in frame members 23, 24 and 28, 29 respectively. The road wheels 35 and 36 are retracted during operation of the machine, and are lowered when the machine is to be moved from one location to another, by hydraulic cylinders 41 and 42 pivotally mounted at their upper ends in brackets 43 and 44 secured to frame member 30. The pivots of the cylinders are indicated at 45, 46 respectively.

The lower ends of the piston rods 47 of the cylinders 41 and 42 are pivotally connected, as shown at 48, to the crank arms on which the road wheels are mounted, the pivot pins being indicated at 49.

Hydraulic fluid is supplied under pressure from the tractor through pipeline 50 and branch lines 51 and 52, which latter are connected by lengths of flexible pipe 53 and 54 to the upper ends of the cylinders.

It will be evident that any other suitable mounting for the retractable road wheels may be provided, and the wheels may be operated by any suitable arrangement of mechanical or fluid operated means other than the means shown.

A triangular trailer hitch 55 is provided having its arms 56 and 57 secured at their rearward ends to frame members 25 and 27. The forward ends of arms 56 and 57 are rigidly secured together by plate 58 and an attaching ring bolt 59 is secured to plate 58.

The machine illustrated is designed particularly to harvest or pull beets and the means for operating on the beets are arranged accordingly, but the novel elements of the machine may be readily incorporated in different arrangements to harvest root crops planted otherwise than in the double rows 60 indicated in Figure 1.

The means for pulling the beets out of the soil are preferably arranged to operate on two double rows 60 at each pass of the machine since this provides a convenient size of machine; these means are identically arranged for each double row so that the description now to be given is applicable to any number of such means and therefore only the left hand unit as seen in Figure 1 is specifically described.

Each root pulling unit comprises a wheel 61 mounted vertically to rotate freely on a short axle 62 (Figure 5) which is supported at each end in the arms of a yoke 63 secured to the under side of frame member 20. Since it is desirable to provide a resilient member mounted on the periphery of the wheel, I utilize an ordinary automobile wheel and fit it with a pneumatic tire 64.

During operation of the machine the wheel and tire 61 and 64 roll along the ground between the rows of each pair of rows, the wheel serving to support the frame of the machine and the tire functioning as one element of the pulling means.

At each side of the wheel 61 similarly equipped wheels 65 and 66 are mounted with their axes of rotation inclined at an angle to the axis of rotation of the wheel 61 in both vertical and horizontal directions. The inclined wheels are arranged so that their tires 67 and 68 press against the sides of tire 64 over an area indicated at 69 in Figure 5. The area over which the tires press together commences at a point substantially at the point of contact of the three tires with the ground and extends through an arc upwardly and backwardly along the contacting walls of the pneumatic tires, the resiliency of which provides the required deformation of the normal shape of the tire.

It will be noted from Figures 2 and 3 that the treads of the three tires lie approximately in a common plane, affording an extended weight carrying area and enabling the machine to function efficiently on soft ground.

The means for mounting the angular wheels on each side of the vertical wheel is shown in detail in Figure 9 and comprises, for wheel 65, a crank axle 70 mounted in a U-shaped member 71 on a pivot 72 extending through the upstanding walls of member 71 toward the front end thereof adjacent the wheel 65.

The front end of member 71 is mounted at the end adjacent the crank axle pivot for angular adjustment in a horizontal plane on a headed pivot pin 73 secured in frame member 24. The rear end of the member 71 is adjustably secured to frame member 23 by a removable bolt and nut 74 adjustably secured to frame member 23. For this purpose a bolt 74 is passed through a hole in member 71 and any one of an arcuate series of holes 75 in the frame member 23. By the described construction it will be obvious that the horizontal angle of inclination of wheel 65 with respect to vertical wheel 61 may be adjusted.

The crank axle 70 is also mounted so as to enable the vertical angle of inclination of the wheel mounting portion 76 of the axle to be adjusted, and for this purpose the upstanding arm 77 of the crank axle is connected by an adjustable link construction 78 to the rear end of member 71. Link construction 78 comprises a yoke 79 pivotally connected by pin 80 to arm 77, a yoke 81 pivotally connected by pin 82 to member 71, and a rod 83 having a reduced diameter end passed through a hole in yoke 81 and riveted over so that the head 84 engages and clamps the rod to said yoke. The opposite end 85 of the rod is threaded and passed through a hole in yoke 79, and is held against movement with respect to yoke 79 by nuts 86 and 87 which are drawn up tight against opposite surfaces of the yoke.

An identical compound adjustment construction is provided for wheel 66 and is secured to frame members 25 and 26 (Figure 1). The same adjustment construction is utilized for the wheels arranged in inclined relation to each vertical wheel 61.

It will be noted that the root vegetable pulling means operate solely by the traction of the ground on the vertical wheels 61 and the inclined wheels associated therewith and by the engagement of the tires of the inclined wheels and the tires of the vertical wheels.

Means are provided to loosen the soil under and around the root vegetables to be pulled and comprise a horizontal blade 88 (Figure 5) supported by a shank 89 extending upwardly and securely bolted or otherwise attached to a horizontal bar 90 mounted on the rear transverse frame member 22. A stiffening web 89ª is provided running down the front of shank 89 and terminating on the rear portion of the horizontal blade 88. In use, blade 88 is dragged through the soil below the root vegetables, the forward edge of the blade being located just behind the area of contact of the supporting and pulling wheels with the ground so that the blades do not encounter the resistance of soil supporting the weight of the machine.

Means are provided to ensure that the leaf tops of the beets or other similar vegetables are raised from the ground in advance of the pulling wheels and guided into position to be gripped between the sides of the tires of the cooperating vertical and inclined wheels; these means are shown in Figures 4, 5, and 6, and the driving means therefor in Figure 11.

The raising and straightening means comprise pairs of conical rollers 91, 92 and 93, 94 disposed in a generally horizontal position and freely rotatable on shafts 95, 96 and 97, 98 which terminate rearwardly in mounting plates 99, 100, and 101, plate 100 being connected to both shafts 96 and 97. The plates 99, 100, and 101 are rigidly supported from the front transverse frame member by downwardly projecting stems 102, 103, and 104, on which the mounting plates are clamped by nuts 105 and 106. The base of each of the conical rollers is provided with a groove 107, the driving means for the conical or tapered rollers being later described.

The rollers of each pair of lifting rollers are rotated in opposite directions outwardly from one another, and since the rollers are mounted close to the ground, their small ends pass under the lower leaves of the heads and the leaves are lifted and straightened as the rollers are moved forwardly with a roller positioned on each side of each row of vegetables.

In order to hold the leaf heads in erect position between the rearward ends of the rollers and to guide the heads to adjacent the point at which they are gripped between the edges of the tires, plates 108 and 109 (Figure 6) are aligned with the inner edges of each pair of rollers, and wider apart at their upper than at their lower edges at the front ends toward the rollers. The plates gradually assume a vertical position toward their rear ends so that the heads are brought upright and fed as a compact bunch between the sides of the tires on the vertical and inclined pulling wheels. The plates 108 and 109 are supported in position in any suitable manner, as for instance as shown in Figure 5, by a T-shaped strap 110 bolted to the under side of the front transverse frame member with the head of the T riveted to a guiding plate.

The driving means for the head lifting rollers, as also for various power driven mechanisms not yet described, are operated from a horizontal shaft 111 (Figure 1) coupled to the power take-off shaft of the tractor. Shaft 111 is supported intermediate the length of the trailer hitch by a bearing 112 mounted on a cross bar 113 secured to the arms of the trailer hitch and passes through a gear box 114. The rear end of the shaft is fitted with one element 115 of an universal coupling. Within the gear box two spaced apart gears 116 and 117 are mounted on the shaft 111.

A shaft 118 is carried along the forward edge of the front transverse member 21 and mounted in a bearing carried by a forward projection 23ª of front-to-back member 23. Shaft 118 is rotated by a gear 119 secured thereto in the gear box and engaging with gear 116.

Belt pulleys 120 and 121 are mounted on shaft 118 and smaller diameter round belt drive pulleys 122, 123, 124 and 125 (Figure 11) are also mounted on the shaft. The smaller pulleys 122 and 123 drive belts (Figure 2) 126 and 127, which are arranged in the belt grooves of rollers 91 and 92 so as to rotate the rollers in opposite directions, as indicated by the arrows. Pulleys 124 and 125 are similarly effective through belts 128 and 129 to rotate rollers 93 and 94 in opposite directions.

A second shaft 130 is carried along the front of transverse member 21 in the opposite direction to shaft 118 and is supported in a bearing carried by a forward projection 29ª of front-to-back member 29. Shaft 130 is rotated by a gear 131 within the gear box and secured to the shaft and engaging with gear 117. Shafts 118 and 130 will rotate in the same direction since gears 119 and 131 engage gears 116 and 117 respectively on opposite sides of the latter gears.

The driving arrangement for the head lifting rollers at the left hand side of the machine as seen in Figure 2 has been described and is identical with that at the right hand side operated by shaft 130 and therefore no further description is thought necessary.

The function of belt pulleys 120 and 121 will be described later in connection with the means provided for cutting off the heads of the vegetables.

The beets or similar vegetables when pulled from the ground by the grip of the lateral contact between the tires of the pulling wheels, are carried upwardly as indicated in Figure 5, and are pulled between means effective to deflect the beets, when released by relief of the lateral pressure thereon of the pulling wheel tires, into collecting means.

As shown in Figure 8, the collecting means are constructed as units 132 mounted behind each pulling wheel assembly. Each unit 132 comprises back pieces 133 by which the unit is mounted on a bar 134 extending across the rearward arms 31ª, 32ª and 34ª (Figure 1) of the angularly arranged struts 31, 32, and 33, 34 between which angular struts the two groups or units of beet pulling wheels are located. The back pieces are bent to provide sloped bottom sections 135. Each of the units 132 comprises three sections spaced from one another to provide a free path for the beets pulled from each double row. The end sections are provided with bent up outer sides 136. Supported along the edges of the gaps 137 between the sections are upstanding walls of heavy rubber 138 which are formed at the upper ends of the walls at each gap to curve into contact with one another to provide a lip-like closure, the edges of which are normally in contact owing to the resiliency of the walls, but which may be forced apart by the beets as they are carried upwardly. The walls will close together as soon as the beets have passed between the lips and will deflect the beets when released into the bottom 135 at one side or the other of each pair of the rubber walls.

It will be noted from Figure 5 that bar 134 is located toward the upper limit of the clamping area of the tires and if it is not desired to cut the heads from the beets or other vegetables, they are knocked loose from the pulling tires by the bar, and fall onto the inclined bottom plates 135, which direct them onto a collecting belt 139. Belt 139 delivers any vegetables deposited thereon to an adjustable dumping belt 140 from which they may fall into the body of a truck which is driven alongside the machine.

The collecting belt 139 (Figure 1) comprises an endless belt of suitable material such as fabric mounted on a plurality of rollers 141 rotating on shafts 142 mounted at their rearward ends in bearings in a rear outer frame member 143 and at their forward ends in angle pieces 144 mounted on the rearward arms 31ª, 32ª, 33ª and 34ª of the angular strut members 31, 32, 33 and 34. The belt 139 is continuously driven by belt pulleys 145 and 146 at the ends of the belt, these belt pulleys being rotated in the same direction to move the upper run of the belt continuously to the right by shafts 147 and 148 on which the pulleys 145 and 146 are respectively mounted. Shafts 147 and 148 are supported at their forward ends in lateral extensions 21ª of the front frame member 21, and at their rearward ends by bearings carried in arms 22ª extending between frame members 23 and 29 and outer frame members. Shafts 147 and 148 are driven from shafts 118 and 130 by pairs of bevel gears 149 and 150.

At the right hand end of belt 139 (as seen in Figure 1) an adjustable dumping belt boom 153 of L-shape is pivoted at the outer end of the short arm 154 coaxially with the shaft 148 of belt pulley 146. The boom 153 may be of any suitable construction, such as of trough section, to support a length of endless belt 140 mounted on driving belt pulley 156 which is fixed on a shaft 157 which is supported in the sides of the boom at the intersection of the long and short arms of the boom. Belt 140 may be supported at points intermediate of its length by rollers 158 mounted on shafts supported in the sides of the boom. Belt drive pulley 156 is driven by a belt 159 mounted on pulleys 160 and 161 mounted on extensions of shafts 148 and 157 respectively (Figure 3).

In order to hold the boom vertical during road traveling of the machine, or with its outer end at any height as may be required by the height of the truck body to be loaded, a small winch drum 162 (Figure 5) is mounted in a bracket 163 supported by upright 163ª and a brace 163ᵇ for said upright. A cable wound on the drum is secured to a bail 163ᶜ secured to the boom 153.

It is preferred to "top" or cut off the heads of the beets as they are collected, and for this purpose a cutter unit 164 is mounted to extend across the top of each of the collecting units 132. The arrangement of the cutter unit 164 is shown in Figure 10 and comprises a cutter housing 165 secured to bar 134. The lower edge of the housing 165 is provided with angular notches or cut-outs 166 and 167, one being located directly above each cooperating pair of rubber walls 138.

Within each housing a saw blade 168 is mounted and supported for reciprocating movement by a backing member 169 guided and positioned in the housing by interfitting therewith. The saw blade is provided with large teeth 170 effective to shear through the neck of the head of leaves, which neck is pulled into the notches by the action of the pulling wheels. Preferably a backing plate 171 is secured between the saw blade and bar 134 in order to prevent any tendency of the saw to buckle.

Each saw blade 168 is reciprocated by means of a pitman 172 (Figure 3) one end of which is connected to a pin 173 projecting from a block 174 secured to the top of the backing member and sliding in a slot 175 cut in the top of the housing 165.

The other end of each pitman is connected to an eccentric pin 176 projecting from the face of a disc 177 mounted at the rearward end of a shaft 177ª. Shaft 177ª is carried in a bearing formed in a crossbar 178 extending between rearward arms 32ª and 33ª (Figure 1), and at its forward end extends through a bearing block 179 mounted on frame member 26. The second part 177ᵇ of universal joint 115 is mounted on the lower end of shaft 177ª which is therefore rotated by rotation of shaft 111.

In order to deposit the cut off heads clear of the path of the root pulling elements of the machine and also prevent the heads from falling into the machine, an apron 180 (Figures 1 and 2) is positioned at the front of the machine in alignment with each group of pulling wheels and is secured as by screws 181 to the frame member 21. The apron is cut from sheet metal and provided with rearwardly extending portions 180ª, 180ᵇ fitting into the spaces between the vertical wheels 61 and the inclined wheels at each side of the vertical wheels. The apron 180 is also cut out to enable pulleys 120 and 121 to project above the apron. Belts 182 and 183 are trained over the pulleys 120 and 121 and over pulleys 184 and 185 (Figure 1) positioned between the inclined pulling wheels and the vertical wheels 61, the pulleys 184 and 185 being mounted on pins secured in the sides of the yokes 63.

The central forward portion of the aprons 180 are angled laterally downward and outward so that leaves falling onto the belts 182 and 183 when freed by reaching the point where the tires of the pulling wheels recede from one another, are carried downwardly by the belts and slide off the apron and fall to each side of the planted rows of vegetables as shown in Figure 5.

A modified form of head ejecting belt is shown in Figure 7 in which resilient fingers 185ª are cemented to provide upstanding fingers 187 and laterally extending fingers 188 and 189. The laterally extending fingers can deflect to conform to the varying space between the inclined and vertical pulling wheels and so effect a thorough clearing of leaves lodged in said space, while the vertical fingers afford a positive engagement with the bunches of leaves falling on the belts and act to move them rapidly onto the aprons for ejectment from the machine.

It will be noted that the machine may be arranged to operate on a single double row, or on more than two double rows without any variation of the construction described in respect of each double row.

*Operation*

In operation the machine constructed as described and illustrated is pulled along by a tractor with each vertical wheel running between adjacent rows of beet plants, which rows are usually from twenty to twenty-four inches apart. The soil around the beets is loosened by the horizontal blade 98 as the machine moves along, which generally hitherto has been a separate operation, and the beets are pulled by their heads from the soil by the resilient grip of the tires of the wheels in each group of pulling wheels. The area of operative contact between the sides of the tires in each group of pulling wheels may be readily adjusted by operating the means adjusting the angular position of the axles of the inclined wheels.

As the machine is pulled along, the rotated head raising and straightening rollers ensure the positive raising of the heads without setting up any drag thereon so that the guiding plates behind the rollers direct the heads into the space between the tires of the vertical and inclined wheels and ensure that the heads are firmly grasped between the tires. The roots pulled from the ground are topped by the reciprocated saws, and the beets delivered from the machine along a path spaced from the outer rows of each pair of double rows.

While I have particularly described an embodiment of the invention at present believed preferable by me, it is to be understood that various modifications of the described embodiment may be made by those skilled in the art without department from the scope of the invention as defined by the claims appended hereto.

I claim:

1. A device for concurrently harvesting two closely-grown parallel rows of vegetables having upwardly extending foilage, that includes: a frame; a vertically disposed wheel movably supporting said frame, said wheel having a pneumatic tire mounted thereon; an outwardly and rearwardly tilted wheel disposed on each side of said vertical wheel and rotatably supported from said frame, said tilted wheels having pneumatic tires mounted thereon, which tires contact the lower and rearward side walls of said vertically disposed tire when said three tires rest on the ground to support the weight of said frame; hitch means secured to said frame; means on said frame for raising and straightening the foliage of two closely-grown rows of vegetables as said frame is drawn longitudinally thereover; means on said frame to guide said raised and straightened foliage into the forwardly disposed lower vertical spaces formed between said vertically and tiltably disposed pneumatic tires to be gripped by the contacting side walls thereof whereby the vegetables attached to said gripped foliage are pulled from the ground by the rearward and upward movement of said contacting side walls; severing means on said frame which separate said gripped foliage from the vegetables attached thereto during the time said foliage is gripped between said contacting side walls; transfer means on said frame for moving said severed foliage laterally on said frame after it is released by said contacting side walls during forward rotation of said pneumatic tires; a laterally disposed elongate conveyor pivotally supported from the rearwardly disposed portion of said frame; means on said frame to direct cropped vegetables into said conveyor; means on said frame for angularly adjusting said conveyor to permit discharge of said cropped vegetables carried thereby into a suitable container; and power means on said frame for actuating said severing means, transfer means and conveyor.

2. A device for concurrently harvesting two closely-grown parallel rows of vegetables having upwardly extending foliage, that includes: a frame; a vertically disposed wheel movably supporting said frame, said wheel having a pneumatic tire mounted thereon; an outwardly and rearwardly tilted wheel disposed on each side of said vertical wheels and rotatably supported from said frame, said tilted wheels having pneumatic tires mounted thereon, which tires contact the lower and rearward side walls of said vertically disposed tire when said three tires rest on the ground to support the weight of said frame; trailer hitch means secured to said frame; two pairs of horizontally disposed conical rollers rotatably supported from said frame above the level of the ground in contact with said tires, with the two rollers comprising each of said pairs being laterally separated from one another, and the space therebetween being in vertical alignment with the forwardly disposed space between one of the side walls of said vertical tire and the adjacent side wall of one of said tilted tires; means on said frame to rotate the two rollers of each of said roller pairs in opposing directions to raise and straighten the foliage of vegetables coming therebetween; means formed on said frame to guide said raised and straightened foliage into the forwardly disposed lower vertical spaces formed between said vertically and tiltably disposed pneumatic tires to be gripped by the contacting side walls thereof, whereby the vegetables attached to said gripped foliage are pulled from the ground by the rearward and upward movement of said contacting side walls; severing means operatively connected to said frame which separate said gripped foliage from the vegetables attached thereto during the time said foliage is gripped between said contacting side walls; transfer means on said frame for removing said severed foliage from said frame after it is released during rotation of said pneumatic tires; means on said frame for collecting said severed vegetables and directing them to a predetermined location; and power means on said frame for actuating said severing means, transfer means and collecting means.

3. A device for concurrently harvesting two closely-grown parallel rows of vegetables having upwardly extending foliage, that includes: a frame; a vertically disposed wheel movably supporting said frame, said wheel having a pneumatic tire mounted thereon; an outwardly and rearwardly tilted wheel disposed on each side of said vertical wheels and rotatably supported from said frame, said tilted wheels having pneumatic tires mounted thereon, which tires contact the lower and rearward side walls of said vertically disposed tire when said three tires rest on the ground to support the weight of said frame; trailer hitch means on said frame; two pairs of horizontally disposed conical rollers rotatably supported from said frame above the level of the ground in contact with said tires, with the two rollers comprising each of said pairs being laterally separated from one another, and the space between said two rollers being in vertical alignment with the forwardly disposed space between one of the side walls of said vertical tire and the adjacent side wall of one of said tilted tires; means on said frame to rotate the two rollers of each of said roller pair in opposing directions to raise and straighten the foliage of vegetables coming therebetween; means formed on said frame to guide said raised and straightened foliage into the forwardly disposed lower vertical spaces formed between said vertically and tiltably disposed pneumatic tires to be gripped by the contacting side walls thereof whereby the vegetables attached to said gripped foliage are pulled from the ground by the rearward and upward movement of said contacting side walls; means supported from said frame for loosening the soil around said vegetables prior to gripping of the foliage thereof by said tires; severing means on said frame which separate the vegetables from said foliage during the time said foliage is gripped between said contacting side walls; transfer means on said frame for removing said severed foliage from said frame after it is released by said contacting side walls during forward rotation of said pneumatic tires; movable means carried by said frame for collecting cropped vegetables; a laterally disposed elongate conveyor pivotally supported from the rearwardly disposed portion of said frame; means operatively connected to said frame for reciprocating said movable means to direct said collected vegetables onto said conveyor; means attached to said frame for angularly adjusting said conveyor to permit discharge of said cropped vegetables carried thereby into a suitable container; and power means on said frame to actuate said severing means, transfer means, and conveyor, and reciprocate said movable means.

4. A device for concurrently harvesting two closely-grown parallel rows of vegetables having upwardly extending foliage, that includes: a frame; a vertically disposed wheel movably supporting said frame, said wheel having a pneumatic tire mounted thereon; an outwardly and rearwardly tilted wheel disposed on each side of said vertical wheels and rotatably supported from said frame, said tilted wheels having pneumatic tires mounted thereon, which tires contact the lower and rearward side walls of said vertically disposed tire when said three tires rest on the ground to support the weight of said frame; hitch means on the front of said frame; two pairs of horizontally disposed conical rollers rotatably supported from said frame above the level of the ground in contact with said tires, with the two rollers comprising each of said pairs being laterally separated from one another, and the space therebetween being in vertical alignment with the forwardly disposed space between one of the side walls of said vertical tire and the adjacent side wall of one of said tilted tires; means to rotate the two rollers of each of said roller pairs in opposing directions to raise and straighten the foliage of vegetables coming therebetween; means on said frame to guide said raised and straightened foliage into the forwardly disposed lower vertical spaces formed between said vertically and tiltably disposed pneumatic tires to be gripped by the contacting side walls thereof whereby the vegetables attached to said gripped foliage are pulled from the ground by the rearward and upward movement of said contacting side walls; and a plurality of laterally spaced vertically adjustable wheels supported from said frame that may be lowered to raise said frame and pneumatic-tired wheels mounted thereon and place the device in a mobile condition.

5. A device for concurrently harvesting two closely-grown parallel rows of vegetables having upwardly extending foliage, that includes: a frame; a vertically disposed wheel movably supporting said frame, said wheel having a pneumatic tire mounted thereon; an outwardly and rearwardly tilted wheel disposed on each side of said vertical wheels and rotatably supported from said frame, said tilted wheels having pneumatic tires mounted thereon, which tires contact the lower and rearward side walls of said vertically disposed tire when said three tires rest on the ground to support the weight of said frame; trailer hitch means on the front of said frame; means carried by said frame for raising and straightening the foliage of two closely-grown rows of vegetables as said wheel-supported frame is drawn longitudinally thereover; means on said frame to guide said raised and straightened foliage into the forwardly disposed lower vertical spaces formed between said vertically and tiltably disposed pneumatic tires to be gripped by the contacting side walls thereof, whereby the vegetables attached to said gripped foliage are pulled from the rearward and upward movement of said contacting side walls; a plurality of laterally spaced vertically movable wheels supported from said frame; and hydraulic means mounted by said frame for lowering said wheels and raising said frame whereby the device is placed in a mobile condition.

6. A device for concurrently harvesting two closely-grown parallel rows of vegetables having upwardly extending foliage, that includes: a frame; a vertically disposed wheel movably supporting said frame, said wheel having a pneumatic tire mounted thereon; an outwardly and rearwardly tilted wheel disposed on each side of said vertical wheels and rotatably supported from said frame, said tilted wheels having pneumatic tires mounted thereon, which tires contact the lower and rearward side walls of said vertically disposed tire when said three tires rest on the ground to support the weight of said frame; hitch means formed on said frame; and means mounted by said frame to guide said raised and straightened foliage into the forwardly disposed lower vertical spaces formed between said vertically and tiltably disposed pneumatic tires to be gripped by the contacting side walls thereof, whereby the vegetables attached to said gripped foliage are pulled from the ground by the rearward and upward movement of said contacting side walls.

References Cited in the file of this patent

UNITED STATES PATENTS

| Number | Name | Date |
| --- | --- | --- |
| 1,114,390 | Serres | Oct. 20, 1914 |
| 1,146,575 | Johnson | July 13, 1915 |
| 1,182,149 | Douglass | May 9, 1916 |
| 1,711,990 | Coatsworth | May 7, 1929 |